United States Patent [19]

Takaya

[11] Patent Number: 5,625,844
[45] Date of Patent: Apr. 29, 1997

[54] PROGRAM SPECIFICATION DATA TRANSFER SYSTEM FOR PROGRAM DEVELOPMENT SUPPORT SYSTEM

[75] Inventor: Masahiro Takaya, Tokyo, Japan

[73] Assignee: NEC Corporation, Tokyo, Japan

[21] Appl. No.: 605,586

[22] Filed: Feb. 22, 1996

Related U.S. Application Data

[63] Continuation of Ser. No. 57,783, May 6, 1993, abandoned.

[30] Foreign Application Priority Data

May 8, 1992 [JP] Japan .................................. 4-141940

[51] Int. Cl.$^6$ .................................. G06F 9/00; G06F 7/00
[52] U.S. Cl. .................... 395/853; 395/500; 395/601; 364/DIG. 1; 364/260; 364/286; 364/222.81
[58] Field of Search ............................. 395/600, 601, 395/853, 500; 364/DIG. 1

[56] References Cited

U.S. PATENT DOCUMENTS

| | | | |
|---|---|---|---|
| 4,607,328 | 8/1986 | Furukawa et al. | 364/200 |
| 4,751,635 | 6/1988 | Kret | 364/200 |
| 5,124,909 | 6/1992 | Blakely et al. | 395/200 |
| 5,211,563 | 5/1993 | Haga et al. | 434/322 |
| 5,261,078 | 11/1993 | Nakaniwa et al. | 395/500 |
| 5,327,560 | 7/1994 | Hirata et al. | 395/700 |
| 5,361,360 | 11/1994 | Ishigami et al. | 395/700 |
| 5,375,207 | 12/1994 | Blakely et al. | 395/200 |

*Primary Examiner*—Thomas G. Black
*Assistant Examiner*—Jean R. Homere
*Attorney, Agent, or Firm*—Foley & Lardner

[57] ABSTRACT

In a program specification data transfer method for program development support system according to the present invention, if a program specification data program is updated in the editing by the specification data edit unit at the terminal, then the update flag of the applicable specification data program is set to indicate the existence of update by the update flag set unit. The updated data extract unit checks the update flag to extract the updated program specification data alone and thus extracted updated program specification data is transferred to the work file at the host computer. The specification data merge unit merges the updated program specification data stored in the work file with the program specification data in the program specification data file at the host computer and stores the merged result to the program specification data file.

4 Claims, 5 Drawing Sheets

PROGRAM SPECIFICATION DATA TRANSFER SYSTEM FOR PROGRAM DEVELOPMENT SUPPORT SYSTEM

This application is a continuation of application Ser. No. 08/057,783, filed May 6, 1993, now abandoned.

BACKGROUNDS OF THE INVENTION

1. Field of the Invention

The present invention relates to a program development support system to generate a target program based on certain program specification data, and particularly relates to a transfer method to transfer the program specification data edited at a terminal to a program specification data file at a host computer.

2. Description of the Prior Art

In a conventional program development support system, program specification data edited and prepared at a terminal is transferred and stored in a program specification data file in a host computer. The host computer then generates a source program based on the program specification data in the program specification data file by using a source generate means, prepares an object program from the source program by using a compile means, and further prepares an executable program by using a link means.

If any failure occurs during testing of the executable program, the program specification data is, if necessary, transferred from the program specification data file in the host computer to the program specification data file at the terminal so that they can be edited at the terminal for debugging. After editing, the program specification data is transferred to the program specification data file at the host computer for storage.

Conventionally, when the program specification data are transferred from the terminal to the host computer, the data transferred to the host program specification data file in the host computer include both of those updated during editing at the terminal and those without any change.

Since all program specification data including those without any change are thus transferred to the host computer after editing at the terminal, the program specification data is transferred using the communication line even when it has not been updated on the terminal, i.e. when its transfer is not necessary. This increases the number of transfers (and the transferred data amount) for program specification data from the terminal to the host and results in long transfer time and prolonged time required for program development.

SUMMARY OF THE INVENTION

It is an object of the present invention to provide a program specification data transfer method for program development support system which can reduce time for transfer by decreasing the transferred data amount when the program specification data edited on the terminal are sent to the host and thereby save time required for program development.

According to a preferred embodiment of the present invention to attain the above object, a program specification data transfer method for program development support system comprises, at the host computer, a program specification data file to store the program specification data for program generation, a work file to temporarily store the updated specification data transferred from the terminal, a transfer means to transfer the program specification data in the program specification data file to the terminal and a specification data merge means to merge the updated program specification data stored in the work file with the program specification data in the program specification data file and store the merged result to the program specification data file, and at the terminal, a program specification data file to store the program specification data transferred from the host computer, an edit means to edit the program specification data in the program specification data file, an updated data extract means to extract the updated program specification data alone from the program specification data after editing, and a transfer means to transfer the updated program specification data extracted by the updated data extract means to the work file at the host computer.

According to a further preferred embodiment, the program specification data has an update flag for judging whether the data is updated or not, and the terminal is provided with an update flag set means to set the update information at the update flag in the program specification data updated during editing by the edit means.

According to a still further preferred embodiment, the update data extract means judges whether the program specification data after editing has been updated or not by checking the update flag in the program specification data and extracts the updated program specification data alone. Besides, the host computer is provided with an update flag cancel means to set the indication showing the lack of updating at the update flag in the program specification data held in the work file when the specification data merge means performs merging.

According to another preferred embodiment of the present invention to attain the above object, a program specification data transfer method for program development support system comprises, at the host computer, a program specification data file to store the program specification data for program generation, a work file to temporarily store the updated specification data transferred from the terminal, a transfer means to transfer the program specification data in the program specification data file to the terminal and a specification data merge means to merge the updated program specification data stored in the work file with the program specification data in the program specification data file and store the merged result in the program specification data file, and at the terminal, a program specification data file to store the program specification data transferred from the host computer, an edit means to edit the program specification data in the program specification data file, an updated data extract means to extract the updated program specification data alone from the program specification data after editing, and a transfer means to transfer the updated program specification data extracted by the updated data extract means to the work file at the host computer, and the program specification data is further provided with an update flag for judging whether the data is updated or not, the terminal is provided with an update flag set means to set the update information at the update flag in the program specification data updated during editing by the edit means, and the host computer is provided with an update flag cancel means to set the indication showing the lack of updating at the update flag in the program specification data held in the work file when the specification data merge means performs merging.

According to a further preferred embodiment, the update data extract means judges whether the program specification data after editing has been updated or not by checking the update flag in the program specification data and extracts the updated program specification data alone.

Other objects, characteristics and effects of the present invention will be clarified in the detailed description below.

DESCRIPTION OF THE PREFERRED EMBODIMENT

Referring to the attached figures, preferred embodiments of the present invention will be described below.

Figure 1:
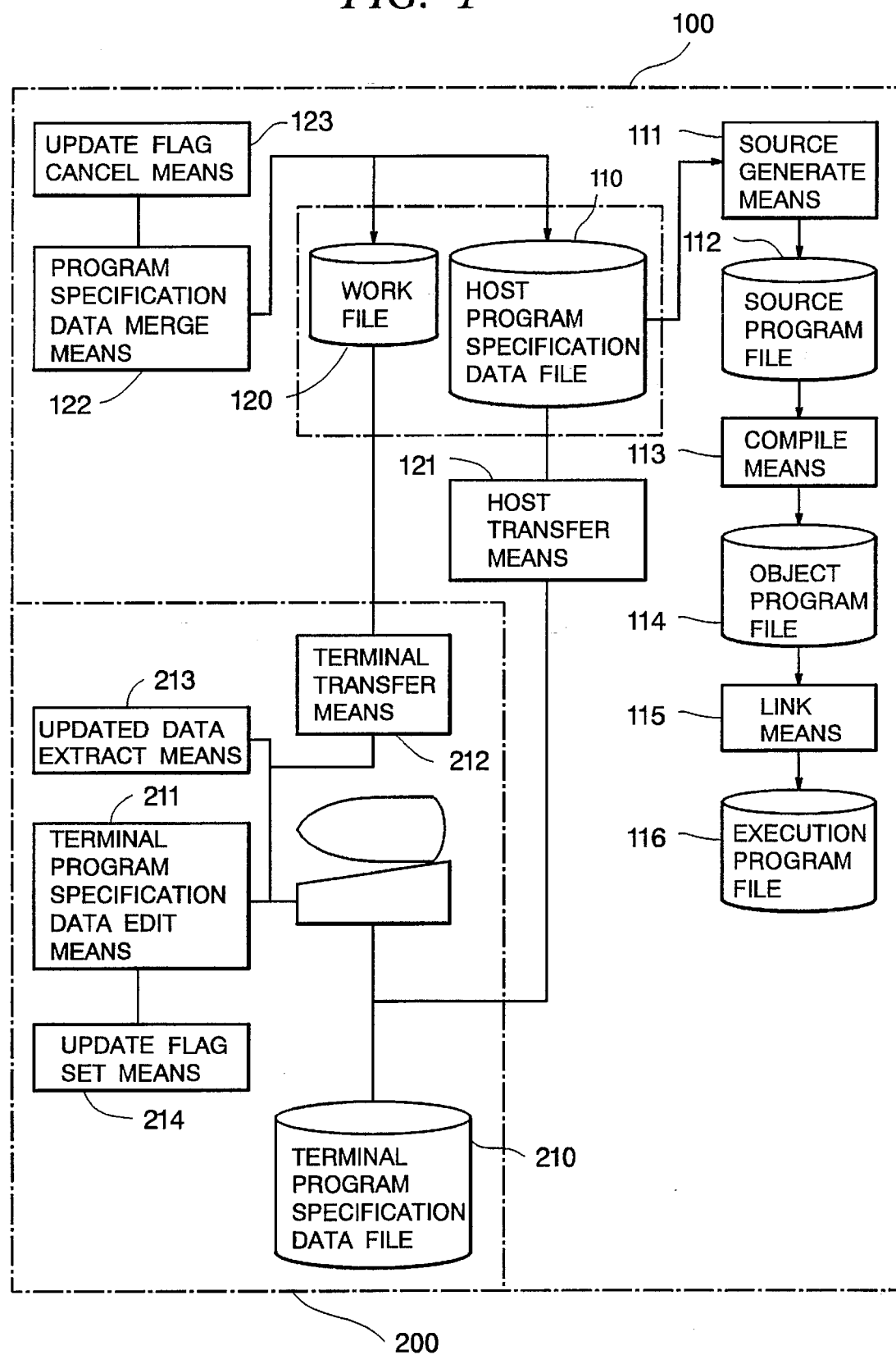
FIG. 1 is a block diagram to show the configuration of a program development support system using the program specification data transfer method according to the present invention.

FIG. 1 shows the configuration of a program development support system according to an embodiment of the present invention. In the figure, a program development support system comprises, on the side of a host computer 100, a program specification data file 110 to store a host program specification data 300, a source generate means 111, a source program file 112, a compile means 113, an object program file 114, a link means 115, an execution program file 116, a work file 120, a host transfer means 121, a program specification data merge means 122 and an update flag cancel means 123, and on the side of a terminal 200, a terminal program specification data file 210, a terminal program specification data edit means 211, a terminal transfer means 212, an update data extract means 213 and an update flag set means 214.

The source generate means 111 generates a source program based on the program specification data describing the specification contents for the program to be generated and registers it in the source program file 112. Such program specification data are held in the host program specification data file 110 at the host 100. The source program is generated in a widely accepted language such as FORTRAN or COBOL. The compile means 113 compiles the source program generated by the source generate means 111 on the source program file 112 to generate an object program to be registered to the object program file 114, and at the same time activates the link means 115. The link means 115 creates an executable program based on the object program generated by the compile means 113 input from the object program file 114 and registers the executable program in the execution program file 116.

The program specification data merge means 122 at the host computer 100 merges the updated program specification data stored in the work file 120 and the program specification data stored in the host program specification data file 110 so as to store the resulted data in the host program specification data file 110. The host transfer means 121 and the terminal transfer means 212 serve for data communications between the terminal program specification data file 210 at the terminal 200 and the work file 120 in host program specification data file 110 at the host computer 100. In addition, the update data extract means 213 extracts the updated specification data only from the program specification data in the terminal program specification data file 210. The program specification data edit means 211 edits the program specification data in the terminal program specification data file 210.

Now, transfer process of the program specification data between the host computer 100 and the terminal 200 is described below.

Figure 4:
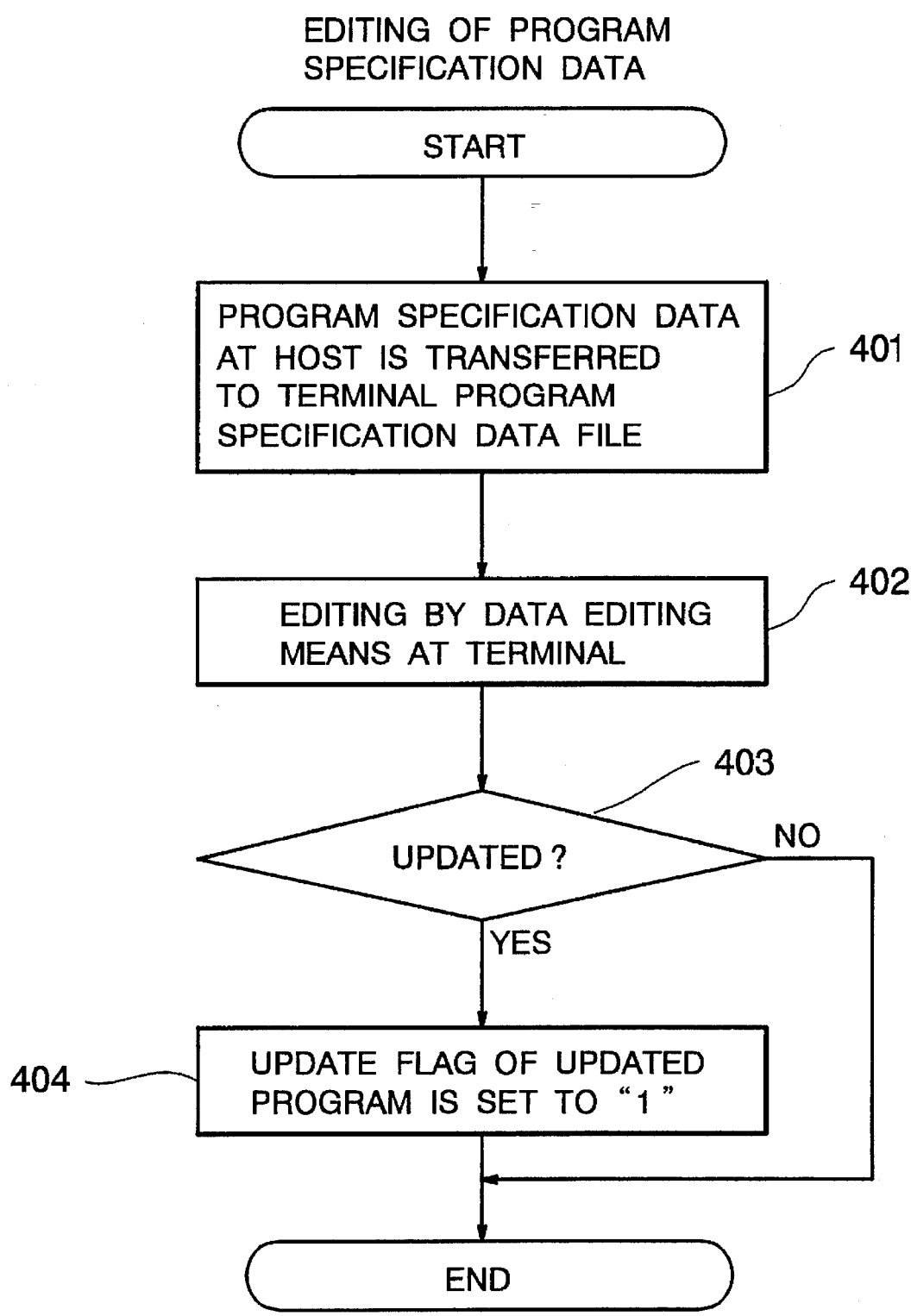
FIG. 4 is a flowchart to illustrate the editing process for program specification data.

Firstly, refer to the flowchart of FIG. 4 for editing of the program specification data. The program specification data stored in the host program specification data file 110 at the host computer 100 are transferred to the terminal program specification data file 210 at the terminal 200 using the host transfer means 121 and the terminal transfer means 212 (Step 401).

Figure 2:
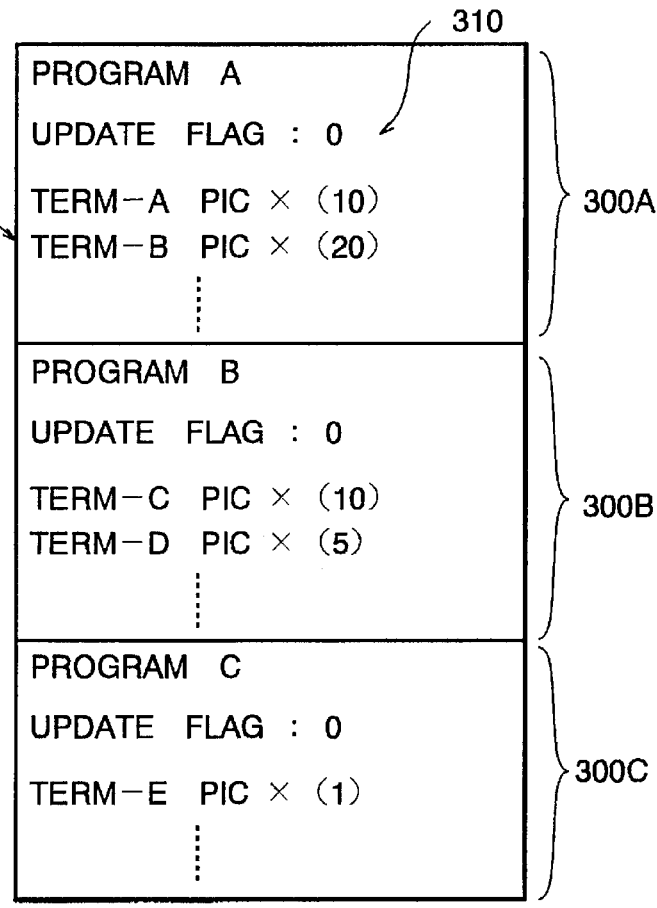
FIG. 2 is a diagram to show an example of contents in a program specification data file.

FIG. 2 shows an example of contents in the terminal program specification data file 210 when the program specification data are transferred from the host computer 100. The terminal program specification data file 210 shown in FIG. 2 holds a plurality of program specification data 300A, 300B and 300C for programs A, B and C respectively. The program specification data 300A, 300B and 300C have an update flag 310 for each to show whether the applicable specification data has been updated or not.

When the update flag 310 has "0", it means that the applicable program specification data has not been updated, and when it has "1", the applicable specification data has been updated. In FIG. 2, the program specification data have just been transferred to the terminal program specification data file 210 and not yet edited. The update flags 310 for the specification data 300A, 300B and 300C are all "0".

Then, the program specification data held at the terminal program specification data file 210 are edited using the terminal program specification data edit means 211 (Step 402). The program specification data are edited for each of 300A, 300B and 300C in FIG. 2.

Then, upon completion of editing by the terminal program specification data edit means 211, the update flag set means 214 is activated. It judges whether the specification data for each program has been updated or not as a result of editing by the terminal program specification data edit means 211 (Step 403).

If any of the program specification data is found to have been updated, then the update flag set means 214 changes the update flag 310 of the applicable specification data from "0" to "1" (Step 404).

For example, suppose the specification data 300C for the program C among the terminal program specification data 300 is edited and updated by the terminal program specification data edit means 211. In this case, the update flag set means 214 judges that the specification data 300C has been updated, and changes the update flag 310 in the specification data 300C for the program C from "0" to "1".

Figure 5:
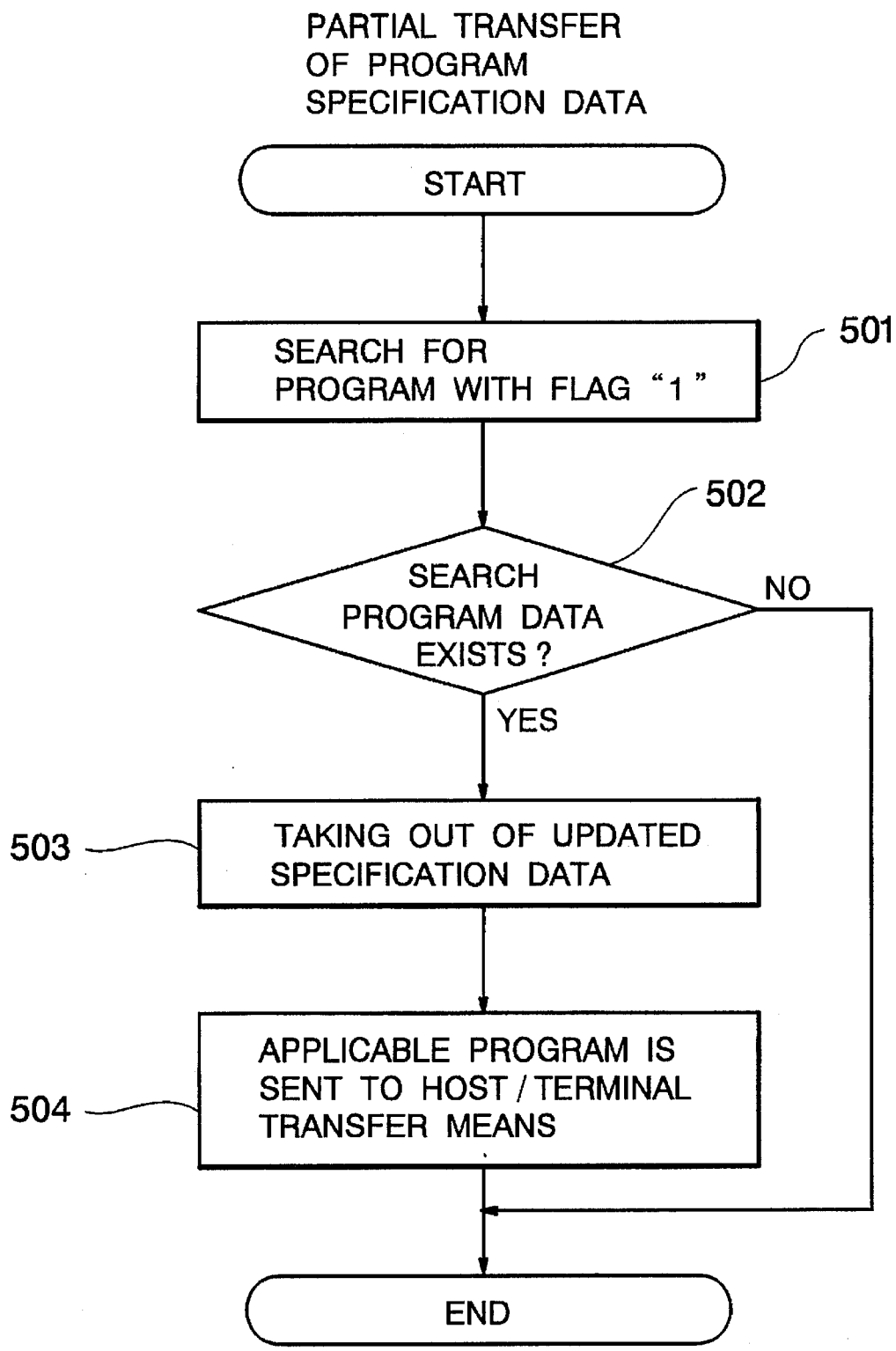
FIG. 5 is a flowchart to illustrate the transfer of edited program specification data to the host computer.

Referring now to the flowchart of FIG. 5, extraction process by the updated data extract means 213 during transfer of the updated program specification data 300 to the host computer 100 is described below.

Figure 3:
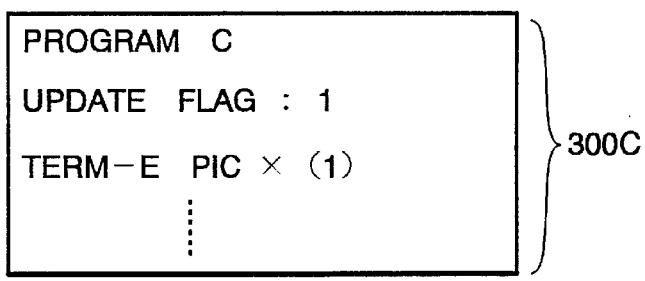
FIG. 3 is a diagram to show an example of updated program specification data.

The update data extract means 213 is activated before the updated program specification data 300 is transferred to the work file 120 in the host computer 100. The update data extract means 213 searches the data in the updated program specification data 300 for any update flag 310 set to "1" and judges whether there exists an updated specification data or not (Steps 501 and 502). Then, it extracts the updated specification data (with the update flag 310 being "1") from the program specification data 300 (Step 503). Next, the updated specification data taken out of the program specification data 300 is transferred to the work file 120 of the host computer 100 using the terminal transfer means 212 and the host transfer means 121 (Step 504). If, among the program specification data 300 as shown in FIG. 2, the specification data 300C for the program C alone is updated, then the specification data 300C of the program C as shown in FIG. 3 is taken out and sent to the work file 120.

Figure 6:
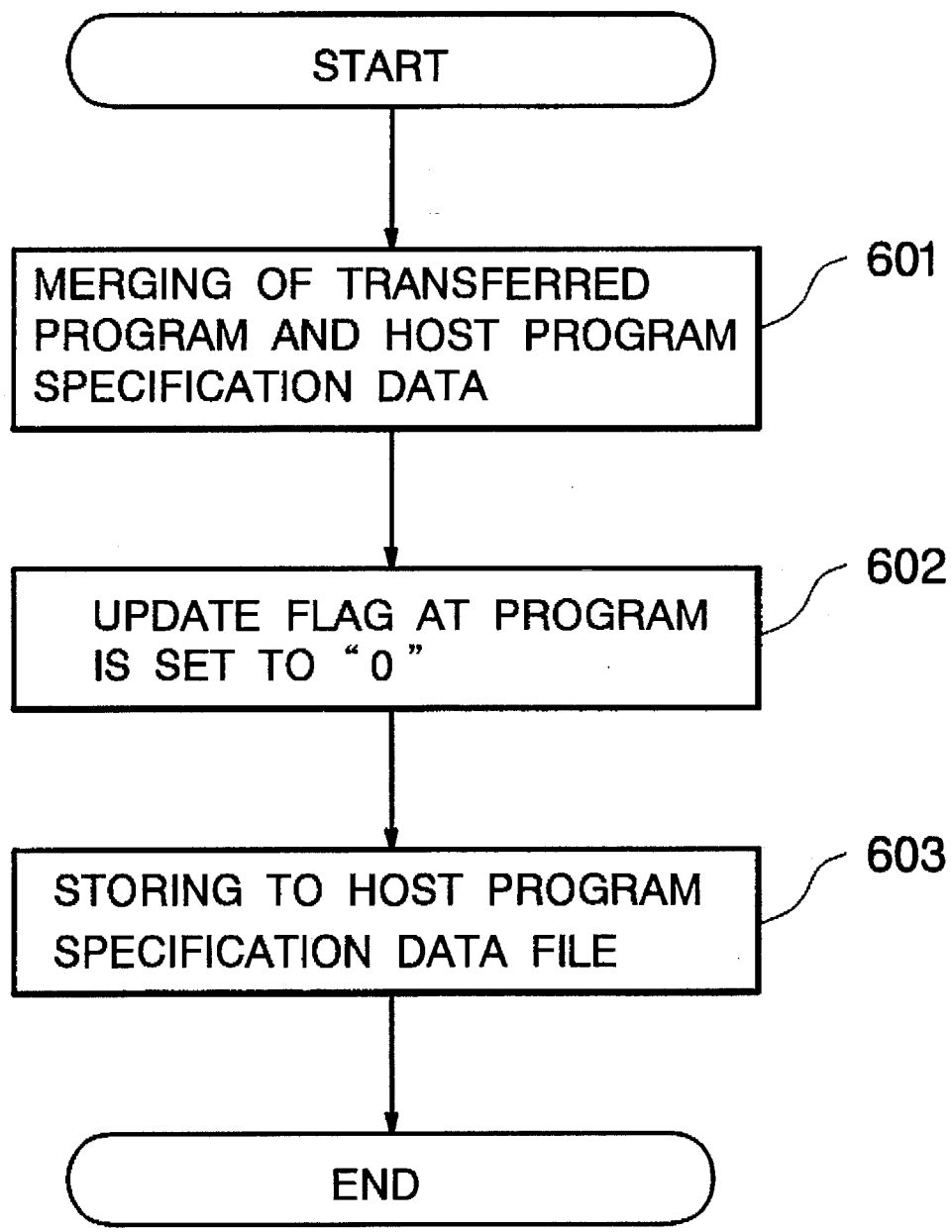
FIG. 6 is a flowchart to illustrate the merging process for updated program specification data.

Next, referring to the flowchart of FIG. 6, registration process of the specification data transferred to the work file 120 at the host computer 100 to the host program specification data file 110 is described below.

The updated specification data transferred to the work file 120 is merged with the program specification data 300 (specification data 300A, 300B and 300C for programs A, B and C) held in the host program specification data file 110 by the program specification data merge means 122 (Step 601). At the same time, the update flag cancel means 123 is activated and the update flag 310 of the above updated specification data is changed from "1" to "0" for cancellation of the update flag 310 (Step 602). The program specification data 300 merged by the program specification data merge means 122 are stored to the host program specification data file 110 with the specification data 300C for program C along being updated (Step 603).

As described above, the present invention enables transfer of the program specification data updated at the terminal alone when the program specification data at the terminal are to be transferred to the host computer. This reduces the amount of data to be transferred, which may result in reduced transfer time.

Obviously, various modifications can be made to the above embodiments. It is intended to cover in the appended claims all such modifications and variations as fall within the true spirit and scope of the present invention.

What is claimed is:

1. A program specification data transfer system for program development support system comprising a host computer and a terminal, the host computer including:
a host program specification data file to store the program specification data for program generation,
a work file to temporarily store an updated data transferred from the terminal,
host transfer means for transferring the program specification data in said host program specification data file to the terminal, and
specification data merge means for merging the updated data stored in said work file with the program specification data in said host program specification data file and storing a merged program specification data in said host program specification data file, and the terminal including:
a terminal program specification data file to store the program specification data transferred from said host computer,
edit means for editing the program specification data in said terminal program specification data file,
updated data extract means for extracting only the updated data from said program specification data after editing, and
terminal transfer means for transferring only the updated data extracted by said updated data extract means to said work file at said host computer,
said program specification data has an update flag for judging whether the data is updated or not, and said terminal has an update flag set means for setting an update information at the update flag in said program specification data updated during editing by said edit means,
said updated data extract means judges whether said program specification data after being edited was updated or not by checking the update flag in said program specification data and extracts only the updated data.

2. A program specification data transfer system for program development support system of claim 1 wherein said host computer has an update flag cancel means for setting the indication showing the lack of updating in the update flag in the program specification data held in said work file when said specification data merge means performs merging.

3. A program specification data transfer system for program development support system comprising a host computer and a terminal, the host computer including:
a host program specification data file to store the program specification data for program generation,
a work file to temporarily store an updated data transferred from the terminal,
host transfer means for transferring the program specification data in said host proqram specification data file to said terminal, and
specification data merge means for merging the updated data stored in said work file with the program specification data in said host program specification data in said program specification data file and storing a merged program specification data in said host program specification data file, and the terminal including:
a terminal program specification data file to store the program specification data transferred from said host computer,
edit means for editing the program specification data in said terminal program specification data file,
updated data extract means for extracting only the updated data from said program specification data after editing, and
terminal transfer means for transferring only the updated data extracted by said updated data extract means to said work file at said host computer,
wherein said program specification data further has an update flag for judging whether the data is updated or not,
said terminal has an update flag set means for setting an update information at the update flag in said program specification data updated during editing by said edit means, and
said host computer has an update flag cancel means for setting the indication showing the lack of updating at the update flag in the program specification data held in said work file when said specification data merge means performs merging, and
said update data extract means judges whether said program specification data after being edited was updated or not by checking the update flag in said program specification data and only extracts the updated data from said program specification data.

4. A program specification data transfer system for program development support system comprising a host computer and a terminal, the host computer including:
a host program specification data file to store the program specification data for program generation, host transfer means for transferring the program specification data in said host program specification data file to said terminal, and specification data merge means for merging the updated program transferred from said terminal with the program specification data in said host program specification data in said program specification data file and storing merged program specification data in said host program specification data file, and the terminal including:

a terminal program specification data file to store the program specification data transferred from said host computer, edit means for editing the program specification data in said terminal program specification data file, updated data extract means for extracting only the updated data from said program specification data after editing, and terminal transfer means for transferring only the updated data extracted by said updated data extract means to said host computer, wherein said program specification data further has an update flag for judging whether the data is updated or not, said terminal has an update flag set means for setting an update information at the update flag in said program specification data updated during editing by said edit means, and said host computer has an update flag cancel means for setting the indication showing the lack of updating at the update flag in the program specification data merged by said specification data merge means, and said updated data extract means judges whether said program specification data after being edited was updated or not by checking the update flag in said program specification data and extracts only the updated data from said program specification data.

\* \* \* \* \*